(12) United States Patent
Manthiramoorthy et al.

(10) Patent No.: US 10,333,836 B2
(45) Date of Patent: Jun. 25, 2019

(54) CONVERGENCE FOR EVPN MULTI-HOMED NETWORKS

(71) Applicant: CISCO TECHNOLOGY, INC., San Jose, CA (US)

(72) Inventors: Natarajan Manthiramoorthy, Fremont, CA (US); Venkatesh Srinivasan, San Jose, CA (US); Rajesh Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/486,933

(22) Filed: Apr. 13, 2017

(65) Prior Publication Data
US 2018/0302321 A1 Oct. 18, 2018

(51) Int. Cl.
*H04L 12/753* (2013.01)
*H04L 12/46* (2006.01)

(52) U.S. Cl.
CPC .......... *H04L 45/48* (2013.01); *H04L 12/4633* (2013.01); *H04L 12/4641* (2013.01)

(58) Field of Classification Search
CPC ...... H04L 12/4641; H04L 45/48; H04L 69/22
See application file for complete search history.

(56) References Cited

U.S. PATENT DOCUMENTS

| | | | | |
|---|---|---|---|---|
| 9,628,409 B1* | 4/2017 | Yuvaraj | ................ | H04L 49/201 |
| 2014/0258485 A1* | 9/2014 | Yang | ................ | H04L 41/12 |
| | | | | 709/223 |
| 2015/0010002 A1* | 1/2015 | Duda | ................ | H04L 45/74 |
| | | | | 370/392 |
| 2015/0124586 A1* | 5/2015 | Pani | ................ | H04L 12/18 |
| | | | | 370/219 |
| 2015/0124821 A1* | 5/2015 | Chu | ................ | H04L 45/22 |
| | | | | 370/392 |
| 2015/0200954 A1* | 7/2015 | Gourlay | ................ | H04L 49/70 |
| | | | | 726/4 |
| 2016/0274926 A1* | 9/2016 | Narasimhamurthy | ................ | |
| | | | | G06F 9/45558 |
| 2017/0085502 A1* | 3/2017 | Biruduraju | ................ | H04L 49/354 |
| 2017/0279705 A1* | 9/2017 | Lin | ................ | H04L 45/02 |

(Continued)

OTHER PUBLICATIONS

"Cisco Nexus 9000 Series NX-OS Release Notes, Release 7.0(3)12(1)," Cisco Systems, Inc., Jun. 6, 2016, 31 pages.

(Continued)

*Primary Examiner* — Benjamin H Elliott, IV

(57) ABSTRACT

Methods for assisting data forwarding during convergence in a multi-homed network are disclosed. In one aspect, a first leaf node is configured to detect when a second leaf node advertises a set of Ethernet segments which are local to the first leaf and advertise reachability information for the second leaf, indicating itself as a backup for the second leaf during convergence. A spine node that receives advertisement messages from such first and second leaf nodes programs its routing table to indicate the direct route to the second leaf as the primary path and the route to the second leaf via the first leaf as a backup path to forward encapsulated packets destined to the second leaf. Upon failure of the second leaf, when the spine node receives data packets destined to the second leaf, the spine node sends the packets to the first leaf instead of the second leaf.

20 Claims, 8 Drawing Sheets

(56) References Cited

U.S. PATENT DOCUMENTS

2018/0062914 A1* 3/2018 Boutros .............. H04L 41/0668
2018/0302321 A1* 10/2018 Manthiramoorthy ... H04L 45/48

OTHER PUBLICATIONS

"Cisco VTS Day Zero Configuration Examples," © 2016 Cisco Systems, Inc., 28 pages.
Sajassi, A., "BGP MPLS-Based Ethernet VPN," Internet Engineering Task Force, RFC 7432, Feb. 2015, 56 pages; https://www.rfc-editor.ord/rfc/pdfrfc/rfc7432.txt.pdf.
"VXLAN Overview: Cisco Nexus 9000 Series Switches," Cisco Systems, Inc., White Paper, Jan. 2015, 10 pages.

* cited by examiner

CONVERGENCE FOR EVPN MULTI-HOMED NETWORKS

TECHNICAL FIELD

This disclosure relates in general to the field of computer networking and, more particularly, to techniques for handling traffic during convergence in an Ethernet Virtual Private Network ("EVPN") multi-homed network environment.

BACKGROUND

Networking architectures have grown increasingly complex in communication environments. A typical network environment contains a myriad of network nodes, including hosts, load balancers, routers, switches, etc. These network nodes support exchange of data, carried in packets, between various hosts connected to the network. Improving operational efficiency and optimizing utilization of resources in such network environments are some of the challenges facing their managers. One such challenge arises from a fact that network nodes may fail (i.e. either the nodes themselves or the relevant communication links to them stop functioning as intended). The process where other nodes in a network environment gradually become aware that a given network node has failed and re-configure themselves to operate accordingly is referred to as a "convergence" or "re-convergence" of a network. Being able to efficiently forward data traffic in a network during the convergence would provide application and data integrity necessary for optimal performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
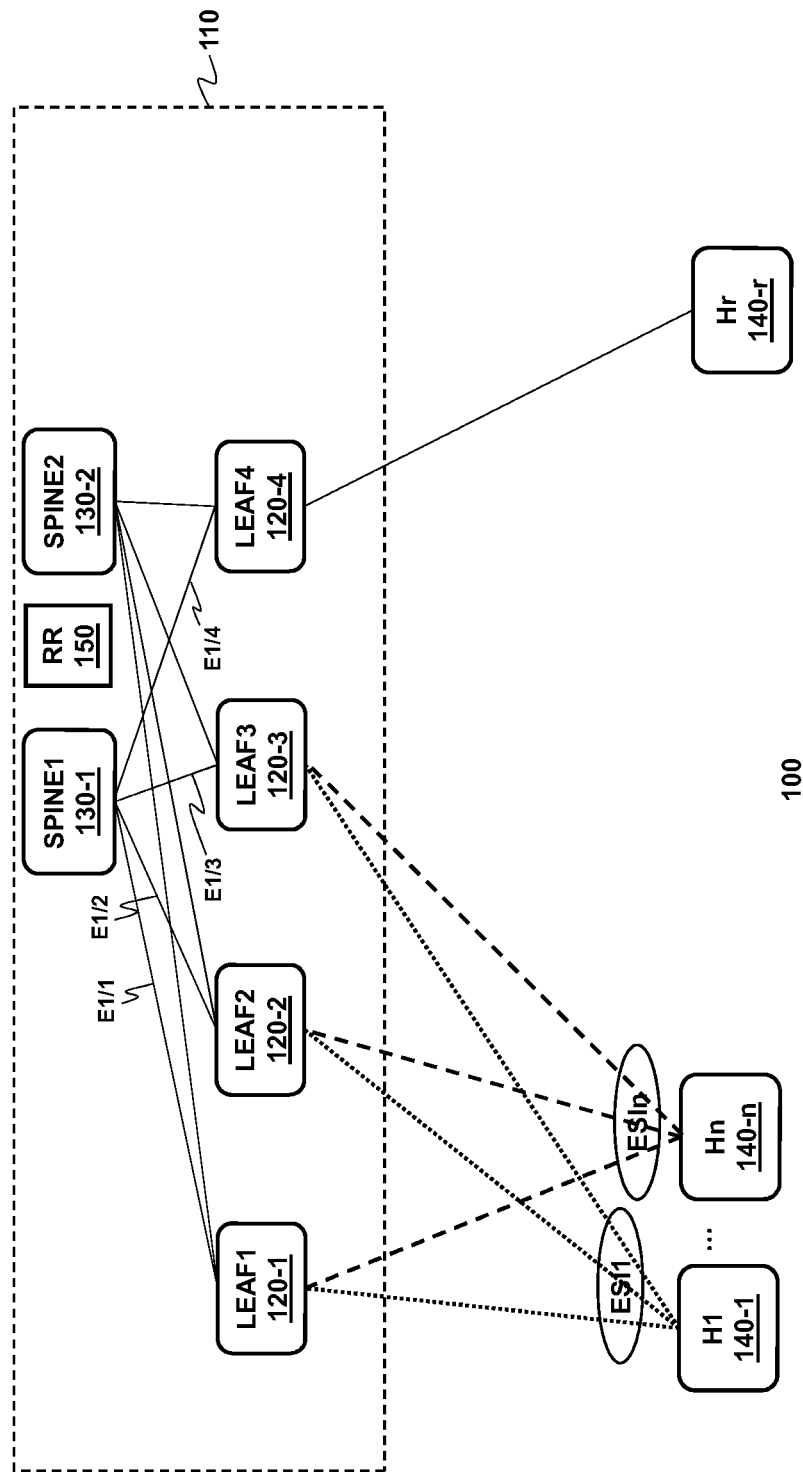
FIG. 1 is a simplified block diagram illustrating an example deployment of an EVPN multi-homed network environment, according to some embodiments of the present disclosure.

Ethernet Virtual Private Network ("EVPN") multi-homing is emerging as an alternate solution to virtual Port Channel (vPC) for active-active multi homing redundancy. One of the challenges with EVPN multi-homing is convergence in the event of one of the leaf nodes failing. In case of such failure, remote nodes will continue to send traffic to the failed leaf node in the overlay network and will rely on BGP to withdraw the routes in the overlay network, which can take several seconds or even much longer as numbers of host routes are increased. Embodiments of the present disclosure are based on using underlay convergence to ensure millisecond convergence in the overlay network, where, as known in the art, the term "underlay network" (or, simply "underlay") refers to the physical network infrastructure that connects the leaf and spine nodes and provides Layer 3 network connectivity between them, while the term "overlay network" (or, simply, "overlay") refers to the virtual tunnel network that is built on top of the underlay network and encapsulates the end point traffic with an additional header.

Embodiments of the present disclosure provide computer-implemented methods for assisting data forwarding during convergence in a multi-homed network comprising a plurality of leaf nodes and one or more spine nodes. In one aspect of the present disclosure, each of the leaf nodes (an exemplary instance of which may be referred to as a "first leaf node") may be configured to assist data forwarding during convergence by detecting when one of the other leaf nodes (an exemplary instance of which may be referred to as a "second leaf node") advertises reachability information for hosts associated with a set of one or more Ethernet Segments (identified by Ethernet Segment Identifiers (ESIs)) which the first leaf node is advertising itself. The first leaf node is then configured to advertise the IP address of the second leaf node (referred to as a "loopback IP address" of the second leaf node), in addition to advertising its own IP address (i.e. its own loopback IP address), as reachability information for the second leaf node for this set of ESIs, indicating that the first leaf node is a backup for reaching the second leaf node during the convergence. In some embodiments, the first leaf node may include in the advertisement a loopback IP address of the second leaf node and a higher cost metric for reaching the host behind second leaf node via the first leaf node compared to reaching the second leaf node directly (i.e. via the IP address of the second leaf node). Each spine node that receives advertisement messages from such first and second leaf nodes programs its underlay routing table storing underlay route reachability information on how to reach leaf nodes to indicate a direct path to the second leaf node (i.e. a path using the IP address of the second leaf node) and to indicate a backup path to the second leaf node via the first leaf node (i.e. a path using the IP address of the first leaf node). Upon failure of the second leaf node, when the spine node receives encapsulated data packets identifying the second leaf node as destination in their outer headers, then, based on the underlay routing table, the spine node sends the encapsulated packets to the first leaf node instead of the second leaf node (because the second leaf node failed). The first leaf node is configured to decapsulate and forward further downstream not only received data packets indicating the first leaf node as the destination, but to also decapsulate and forward further downstream received data packets indicating the second leaf node as the destination, provided the first and second leaf nodes share the same ESIs. Such an approach may provide a useful addition to existing EVPN multi-homing techniques in improving failure convergence times without requiring layer 2 ("L2") connectivity or the complexity of exchanging protocol packets or maintaining protocol states.

In the following detailed description, various aspects of the illustrative implementations will be described using terms commonly employed by those skilled in the art to convey the substance of their work to others skilled in the art. For example, the term "multi-homed" and various derivatives of this term refer to hosts being communicatively connected to two or more leaf nodes of a network. The term "host" (sometimes interchangeably referred to as a "host device," or a "customer/client device") refers to any computing/storage device that may need to receive and/or send data over the network. In various embodiments, a "host" may be or may include, by way of non-limiting example, any device providing storage, network, or/and computing resource. Examples of hosts include, but are not limited to, a laptop computer, cellular telephone, IP telephone, smart phone, tablet computer, convertible tablet computer, server, computer, workstation, mainframe, virtual machine (whether emulated or on a "bare-metal" hypervisor), container, embedded computer, embedded controller, embedded sensor, personal digital assistant, computing appliance, network appliance, receiver, wearable computer, handheld calculator, or any other electronic, microelectronic, or microelectromechanical device for processing and communicating data. As used herein, the term "network node" (sometimes interchangeably referred to as a "network element," "node,", or "network device") is meant to encompass routers, switches, gateways, bridges, computers, processors, servers, network appliances, modules, cable boxes, load balancers, firewalls, inline service nodes, proxies, or any other suitable device, component, element, or proprietary appliance operable to exchange information in a network environment in accordance with embodiments described herein. Network nodes described herein may include any suitable hardware, software, components, modules, or interfaces that facilitate the operations thereof, and may be inclusive of appropriate algorithms and communication protocols that allow for the effective exchange of data or information. As used herein, the terms "upstream" and "downstream" refer to the flow of data traffic from one host to another host, where, in a given situation, a host sending the data is referred to as a "source" host, while the host to which the data is sent is referred to as a "receiver" (or "destination") host. Within the network, an "upstream network node" (or simply an "upstream node") refers to an ingress node that the source host uses to inject data traffic into the network, while a "downstream network node" (or simply a "downstream node") refers to an egress node through which the traffic is ejected from the network to be provided to the receiver host. Network nodes may operate as both upstream and downstream nodes for different traffic flows. Similarly, hosts may operate as both source and receiver hosts for different traffic flows.

As will be appreciated by one skilled in the art, aspects of the present disclosure, in particular a functional entity performing embodiments of the methods related to assisting data forwarding during convergence, described herein, may be embodied in various manners. Accordingly, various aspects of the present disclosure relate to systems, computer programs, mechanisms, and means for carrying out the methods according to various embodiments described herein. Such systems, computer programs, mechanisms, and means could be included within various network nodes, such as e.g. switches and routers, of a network environment, or distributed among a plurality of network nodes. A computer program may, for example, be downloaded (updated) to the existing network devices and systems (e.g. to the existing routers, switches, various control nodes within a network environment, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the methods assisting data forwarding during convergence according to various embodiments described herein.

In yet another aspect, the present application relates to various data structures to be used in messages exchanged within and data stored in a network environment. In one embodiment, such a data structure may be included within route advertisement messages. In another embodiment, such a data structure may be included within routing tables stored at various network nodes assisting in forwarding data during convergence as proposed herein.

Example Embodiments

For purposes of illustrating certain example methods for assisting data forwarding during convergence in a multi-homed network environment described herein, it is important to understand the communications that may be traversing the network. The following foundational information may be viewed as a basis from which the present disclosure may be properly explained. Such information is offered for purposes of explanation only and, accordingly, should not be construed in any way to limit the broad scope of the present disclosure and its potential applications.

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the network nodes interact with each other. Computer networks may be further interconnected by intermediate network nodes, such as routers, switches, hubs, or access points (APs), which can effectively extend the size or footprint of the network.

The physical topology of an exemplary data center may be based on a two-tier tree, also known as a Clos network, in which a plurality of leaf nodes (which may e.g. be implemented as Top of Rack ("ToR") switches or routers) connects to each of one or more of spine nodes (implemented as switches or routers) and vice versa. The term "underlay network/fabric" is sometimes used to describe the physical network infrastructure that connects the leaf and spine network nodes and provides a Layer 3 ("L3") network connectivity between them.

FIG. 1 provides a simplified block diagram illustrating an example deployment of a network environment 100 including nodes/devices interconnected by various methods of communication, according to some embodiments of the present disclosure. Elements of FIG. 1 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIG. 1 are depicted with communication lines traversing the network environment 100.

In the network environment 100, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node and a destination node via a network. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Those skilled in the art will recognize that the number of devices shown and the specific configuration shown in the network environment 100 is for illustrative purposes and does not limit the present technology. Network environments that include additional and/or different components and connections are contemplated herein and are within the scope of the present disclosure.

FIG. 1 illustrates an underlay network 110 comprising a plurality of leaf nodes 120, each of which can be connected to one or more of a plurality of spine nodes 130 (i.e. the underlay fabric 110 refers to the Physical network infrastructure that connects the leaf and spine switches and provides L3 network connectivity between them). As an example, FIG. 1 illustrates leaf nodes with four leaf nodes, LEAF 120-1 through LEAF 120-4, where each leaf node is connected to two spine nodes, SPINE 130-1 and SPINE 130-2. However, discussions herein are applicable to network environments having any other number of two or more leaf nodes 120 and one or more spine nodes 130.

Each of the leaf nodes 120 may be implemented as a ToR switch located in a rack unit (not shown) that houses one or more network elements, such as e.g. physical servers (not shown). Each of the spine nodes 130 may be implemented using routers or switches, and is configured to forward communications between the physical servers of the leaf nodes 120, in the rack unit and other network elements.

The network environment 100, e.g. a data center or service provider network, can provide service to hosts 140, shown in the example of FIG. 1 with host H1 140-1 through host Hn 140-n and a host Hr 140-r, via leaf nodes that are located at the edge of the network 110 (i.e. leaf nodes which act as ingress and egress nodes for the network). As used herein, hosts H1 through Hn illustrate any number of n hosts, where n is an integer equal to or greater than 1, e.g. n may be 100. On the other hand, host Hr illustrates an exemplary remote host, i.e. r may be equal to n+1, e.g. r may be 101. Discussions provided herein are applicable to any number of hosts 140, as long as there is at least one remote host acting as a source host, e.g. host Hr, and one host acting as a receiver host, e.g. host H1.

In various embodiments, all of which are covered by the descriptions provided herein and the illustration of FIG. 1, each leaf node 120 may be connected to the hosts 140 directly, via a Customer Edge (CE) device (e.g. host, router or switch) located at the edge of a customer network (not specifically shown in FIG. 1), or/and via an Access Network (AN) providing connectivity (via Ethernet Virtual Circuits (EVC)) in order to interconnect leaf nodes and CE devices (also not specifically shown in FIG. 1).

Each of the hosts 140 can be multi-homed, i.e. connected to two or more leaf nodes 120 (referred to, collectively, as a "redundancy group"), in order to e.g. increase reliability or performance, or to reduce cost. A multi-homed host can tolerate certain network failures because the connection to two or more leaf nodes provides additional redundancy. In the case where a host is multi-homed to two or more leaf nodes, the set of Ethernet links (also referred to as "pseudowires") between the host and each of the two or more leaf nodes provides additional redundancy. Such a set of Ethernet links between the host and each of the two or more leaf nodes constitutes an Ethernet Segment (ES) having a certain ES identifier (ESI). FIG. 1 illustrates a host H1 being multi-homed to three leaf nodes, LEAF1, LEAF2, and LEAF3, with the set of Ethernet links between host H1 and each of LEAF1, LEAF2, and LEAF3 being shown in FIG. 1 with dotted lines representing the links of the Ethernet Segment 1 having an Ethernet Segment Identifier ESI1. Similarly, FIG. 1 illustrates a host Hn also being multi-homed to leaf nodes LEAF1, LEAF2, and LEAF3, with the set of Ethernet links between host Hn and each of LEAF1, LEAF2, and LEAF3 being shown in FIG. 1 with dashed lines representing the links of the Ethernet Segment n having an Ethernet Segment Identifier ESIn. While FIG. 1 does not specifically illustrate the host Hr as being multi-homed (FIG. 1 illustrates the host Hr being connected only to LEAF4), this host can be multi-homed as well.

When a host is multi-homed, there are two redundancy modes of operation. In one mode, an all-active mode, all of the leaf nodes attached to a particular ES are allowed to forward traffic to/from that ES. In another other mode, a single-active mode, only a single leaf node (the designated forwarder, sometimes abbreviated as "DF"), within the redundancy group of leaf nodes attached to a particular ES, is allowed to forward traffic to/from the ES. Embodiments of the present disclosure are particularly applicable to all-active mode where links which connect hosts to multiple VTEPs constitute one Ethernet segment represented by a particular ESI.

Overlay networks in general, and Internet protocol ("IP") overlay networks in particular, are gaining popularity for providing virtual machine ("VM") mobility over Layer 3 ("L3") networks. Virtual eXtensible Local Area Network ("VXLAN") is a technique for providing a Layer 2 ("L2") overlay on an L3 network. In particular, VXLAN is used to address the need for overlay networks within virtualized data centers accommodating multiple tenants. In such overlay networks, native frames (i.e. L2 frames) exchanged between the leaf and spine nodes are encapsulated with an outer Internet Protocol (IP) (i.e. L3) overlay encapsulation, along with a VXLAN header, and exchanged between the leaf and spine nodes within encapsulated packets. In general, an "overlay network" refers to a virtual tunnel network that is built on top of an underlying network infrastructure (i.e. on top of the underlying underlay network illustrated in FIG. 1) by encapsulating the end point traffic exchanged between the leaf nodes 120, via the spine nodes 130, with an additional header. Encapsulation of traffic with an IP overlay encapsulation, and decapsulation of the encapsulated data packets is performed by the leaf nodes 120, where a hardware or software component within the leaf nodes 120 that performs VXLAN encapsulation and decapsulation is referred to as a VXLAN tunnel endpoint ("VTEP"). An outer destination address of an encapsulated packet includes a MAC address of the VTEP to which the packet is to be sent (that MAC address referred to as routing MAC(RMAC)) and an IP address of the VTEP to which the packet is to be sent. An inner destination address includes one or more MAC addresses of the end hosts. In a simple illustrative example without addressing multi-homing, consider that a remote host Hr connected to a VTEP shown in FIG. 1 as LEAF4 and a local host H1 connected to a VTEP shown in FIG. 1 as LEAF2 communicate with each other through the VXLAN tunnel between VTEPS LEAF4 and LEAF2. Assume that address learning has been done on both sides and corresponding MAC-to-VTEP mappings exist on both VTEPs. When host Hr sends traffic to host H1, it forms Ethernet frames with MAC address of host H1, MAC-H1, as the destination MAC address and sends them out to LEAF4. Upon receiving such original frames, LEAF4 uses the MAC-to-VTEP mapping in its mapping table to determine that a host identified by the DMAC address MAC-H1 can be reached via LEAF2, performs VXLAN encapsulation on the received Ethernet packets by adding to the packets VXLAN, UDP, and outer IP address header identifying LEAF2 as the packets' destination. In the outer IP address header of the encapsulated packets, the source IP address is the IP address of the VTEP LEAF4, and the destination IP address is the IP address of the VTEP LEAF2. LEAF4 then performs an IP address lookup for the IP address of the VTEP LEAF2 to resolve the next hop in the transit network and subsequently uses the MAC address of the next-hop device (i.e. the RMAC of either SPINE1 or SPINE2) to further encapsulate packets in an Ethernet frame to send to the next-hop device SPINE1 or SPINE2. These encapsulated packets are routed towards LEAF2 through the transport network, which includes the spine nodes 130, based on the outer header IP addresses of the encapsulate packets, which has the IP address of LEAF2 as the destination address. In other words, the spine nodes 130 only use the destination address in the outer header of the encapsulated packets in order to forward the packets and are ignorant about the packets being encapsulated. After LEAF2 receives the encapsulated packets, it strips off the outer Ethernet, IP, UDP, and VXLAN headers, and forwards the packets to host H1 based on the original destination MAC address MAC-H1 in the Ethernet frame.

EVPN is an L2 Virtual Private Network (L2VPN) solution over IP/multiprotocol label switching (MPLS) networks. Originally designed for applications such as data center interconnect and business L2VPN services, EVPN is recently considered as a Network Virtualization Overlay (NVO) solution. In particular, EVPN Border Gateway Protocol (BGP) can be used as a control protocol to distribute host reachability and underlay tunnel endpoint information. To that end, BGP route advertisement messages may be used to advertise reachability to the hosts via their associated leaf nodes and BGP route withdrawal messages may be used to withdraw the advertised reachability information for the hosts, when such information is no longer valid (e.g. because a particular leaf node failed).

For example, consider a scenario where one of the leaf nodes illustrated in FIG. 1, e.g. LEAF2 advertises reachability information for hosts H1-Hn. To that end, LEAF2 sends one or more BGP route advertisement messages which indicate to the spines nodes SPINE1 and SPINE2, as well as to other leaf nodes, that host prefixes H1-Hn can be reached via LEAF2. In response, the spine nodes update their underlay route reachability information to include an IP address of LEAF2 as a path for forwarding packets having LEAF2 identified as a destination of their outer headers (the underlay route reachability information stored in what may be referred to as "underlay routing tables" of the spine nodes) and the leaf nodes configure their routing tables to reflect that host prefixes H1-Hn can be reached via LEAF2. Consider, further, that a remote host Hr wishes to send data to one of the hosts H1-Hn, e.g. to host H1. As explained in the example described above, in this case, the remote host Hr sends the data to its' ingress node LEAF4. Since LEAF4 knows that host H1 is to be reached via LEAF2 (because LEAF4 previously received BGP route advertisement messages from LEAF2, the messages comprising reachability information for host H1), LEAF4 encapsulates data received from the remote/source host Hr with an outer encapsulation header indicating LEAF2 as the destination virtual tunnel endpoint (VTEP) for the data, i.e. an outer header destination MAC (DMAC) of an encapsulated packet includes a MAC address of SPINE1 or SPINE2 and an outer header destination IP (DIP) field of an encapsulated packet includes an IP address of LEAF2. In case multiple spine nodes are present in the transport network, from LEAF4, there are multiple paths to LEAF2, via different spine nodes and these spines will be chosen by regular hashing mechanism of outer IP header, as known in the art. Because each of the different spine nodes, e.g. each of SPINE1 and SPINE2 shown in FIG. 1, has previously received route advertisements from LEAF2, it has route reachability information to reach LEAF2 stored in its underlay routing table and, based on this route reachability information, each spine node can forward the encapsulated packet to LEAF2. In turn, LEAF2 will decapsulate the packet and forward the data further downstream based on the MAC address of the host H1, as described in the example above, eventually reaching the host H1.

In conventional implementations, such a scenario may encounter problems immediately following failure of the leaf node LEAF2, during the convergence time period (i.e. until all of the relevant network nodes in the underlay network 110 have been reconfigured to account for the failure). In particular, it will take some time before the ingress leaf node, in this scenario—LEAF4, will know that LEAF2 has failed and that host H1 is to be reached via another leaf node. One reason for this is that, with EVPN multi-homing solutions as e.g. defined in RFC7432, network convergence following a node failure relies on BGP withdrawal advertisements to reach the first-hop leafs, in this case, to reach LEAF4 which is the first-hop for the data sent by the source host Hr. In conventional implementations, during this time period, LEAF4 will continue to encapsulate and send packets indicting LEAF2 as the destination in the outer headers of the encapsulated packets, as described above, but the spine nodes, configured to forward encapsulated packets only based on the destination leaf node identified in the outer header, will not be able to forward the packets further because LEAF2 has failed, resulting in such packets being dropped. For the time period until the network has reached convergence following the failure of LEAF2 (which includes e.g. a time period necessary for BGP to withdraw the reachability of host routes behind LEAF2), LEAF4 may continue to send traffic to LEAF2, but since LEAF2 is down, the spine node(s) will drop those packets resulting in several seconds of traffic loss, depending on the number of host routes to be withdrawn using BGP. In case the destination host H1 is multi-homed to multiple VTEPs (as shown in FIG. 1 with hosts H1-Hn being multi-homed to LEAF1, LEAF2, and LEAF3), VTEPs LEAF1 and LEAF3 will also advertise BGP reachability information for the hosts H1-Hn in the manner described above, so that the spine nodes update their underlay route reachability information with routes to forward packets to LEAF1 and LEAF3, and the leaf nodes configure their routing tables to reflect that host prefixes H1-Hn can be reached via LEAF1 and LEAF3 as well. In this case, ingress node LEAF4 will encapsulate data received from the remote host Hr with one of LEAF1, LEAF2, or LEAF3 as the outer header destination address (e.g. based on hashing), which, in case LEAF2 is used as an outer header destination and in case LEAF2 failed, will cause a similar problem as described above—since LEAF2 is down, the spine nodes will not be able to forward data packets having LEAF2 identified as the destination in their outer header.

Inventors of the present disclosure realized that the multi-homing nature of the hosts can be exploited to expand their reachability and assist data forwarding during convergence (i.e. in the time period where the ingress leaf node is not yet aware of a failure of an egress leaf node to which the ingress leaf node intents to send data traffic). In particular, embodiments of the present disclosure are based on an insight that, when a particular leaf node advertises reachability information for a hosts associated with a given set of one or more ESIs, another leaf node having Ethernet links with the same ESIs (i.e. another leaf node advertising reachability information for the hosts in the same ESIs) can also advertise reachability information, indicating to spine nodes that encapsulated packets with outer headers indicating the original leaf node as the destination can also be routed to this other leaf node that shares ESIs with the original leaf node. In this manner, the latter leaf node offers itself as a backup path for forwarding encapsulated packets having the original node as the outer header destination in case the original node failed (i.e. either the original node itself or the relevant communication links thereto stopped functioning as intended). When there are more than two leaf nodes advertising reachability information for hosts associated with the same set of ESI segments, each one of the leaf nodes can offer itself as a backup node for each other leaf node by advertising reachability information for the other leaf nodes with its' own IP addresses. For the example shown in FIG. 1, consider that LEAF2 advertises reachability information for hosts H1-Hn, as described above. According to the embodiments of the present disclosure, LEAF1 and LEAF3, having received the route advertisements for hosts H1-Hn from LEAF2, for ESI1-ESIn, will recognize that each of LEAF1 and LEAF3 also has links in ESI1-ESIn, and, therefore, each of LEAF1 and LEAF3 will send route advertisements for reaching LEAF2 by each advertising the IP address of LEAF2 with a higher metric as compared to a metric with which LEAF2 advertised its IP address to spine nodes. After the spine nodes 130 receive these loopback route advertisements, spine nodes can program (i.e. fill) their underlay routing tables indicating a direct route to LEAF2 as known in the art and described above, and also indicating leaf nodes LEAF1 and LEAF3 as backup nodes for reaching LEAF2 (i.e. indicating leaf nodes LEAF1 and LEAF3 as backup nodes for forwarding packets destined to LEAF2). In other words, spine nodes would now have backup paths for every VTEP in an ES group through the other VTEPs in that group sharing the same ESI. In this manner, when a spine node receives a packet having LEAF2 identified as the destination in the outer header of the packet, the spine node would use path to LEAF2 as the main route to forward the packet if LEAF2 is functional (i.e. not failed), but in case LEAF2 failed, the spine node would use either LEAF1 or LEAF3 as the backup paths for LEAF2, despite the fact that the outer header indicated LEAF2 as the destination VTEP for the packet.

In some embodiments when more than one backup nodes are provided for each destination VTEP, one or more criteria in a spine node selecting a particular backup node for forwarding traffic to in case the primary leaf node failed may be based e.g. on different backup leaf nodes including different values of cost metric in their route advertisements for the primary leaf node. In other embodiments, a spine node may be configured to select a particular backup node based on any other criteria (e.g. based on load-balancing), or select one randomly.

Now, even though LEAF4 does not yet know that LEAF2 has failed and will continue to encapsulate data packets with an outer destination identifying LEAF2 (e.g. by having the outer DIP of the packet encoding an IP address of LEAF2), one of the spine nodes 130 that receives such a packet, will be able to forward the data packet destined to LEAF2 to one of the backup nodes, i.e. either to LEAF1 or to LEAF3. In turn, according to embodiments of the present disclosure, each of the backup nodes are configured to decapsulate not only the packets (received from the spine nodes 130) where each of these backup nodes is identified as the outer destination of the encapsulated packet, but also to decapsulate packets in which it is the original node LEAF2 for which these backup nodes re-advertised the route that is identified as the outer destination.

Figure 6:
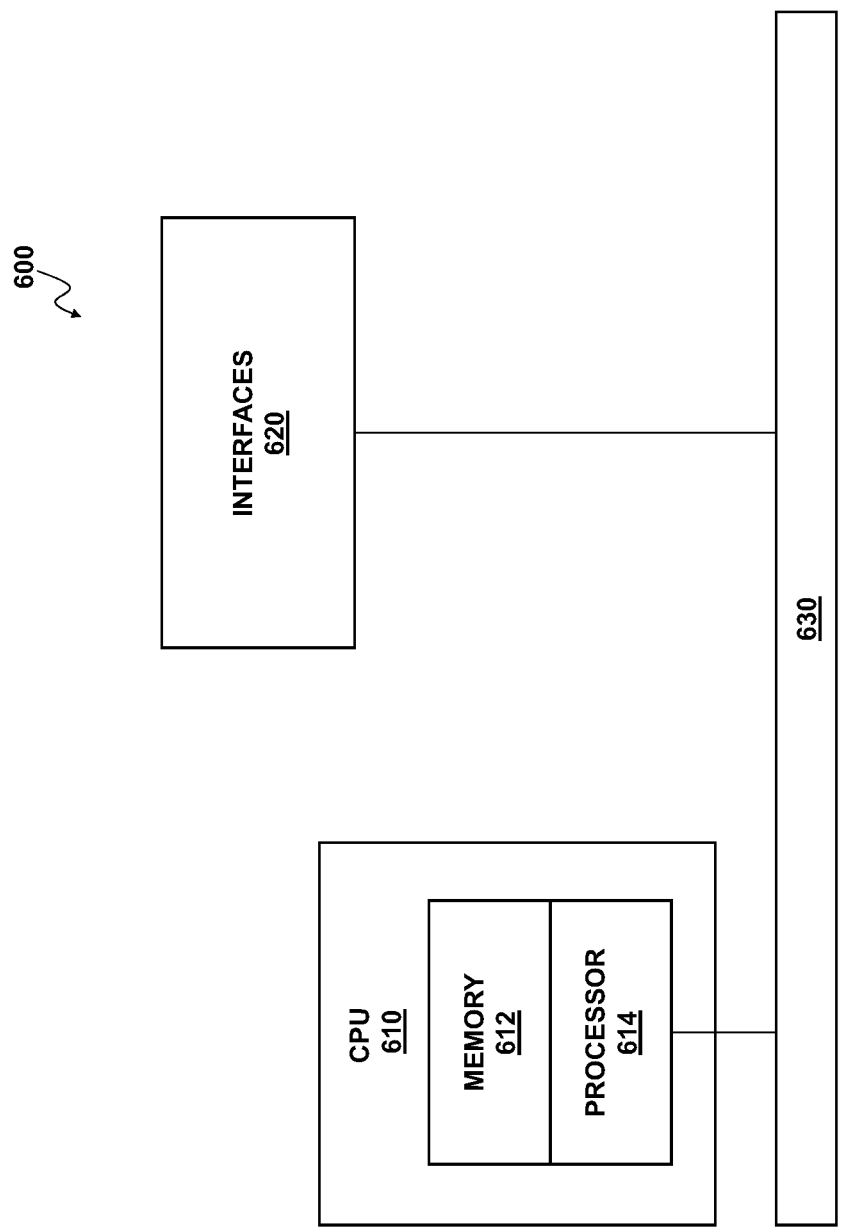
FIG. 6 illustrates an example network device suitable for implementing various embodiments of the present disclosure.
Figure 7:
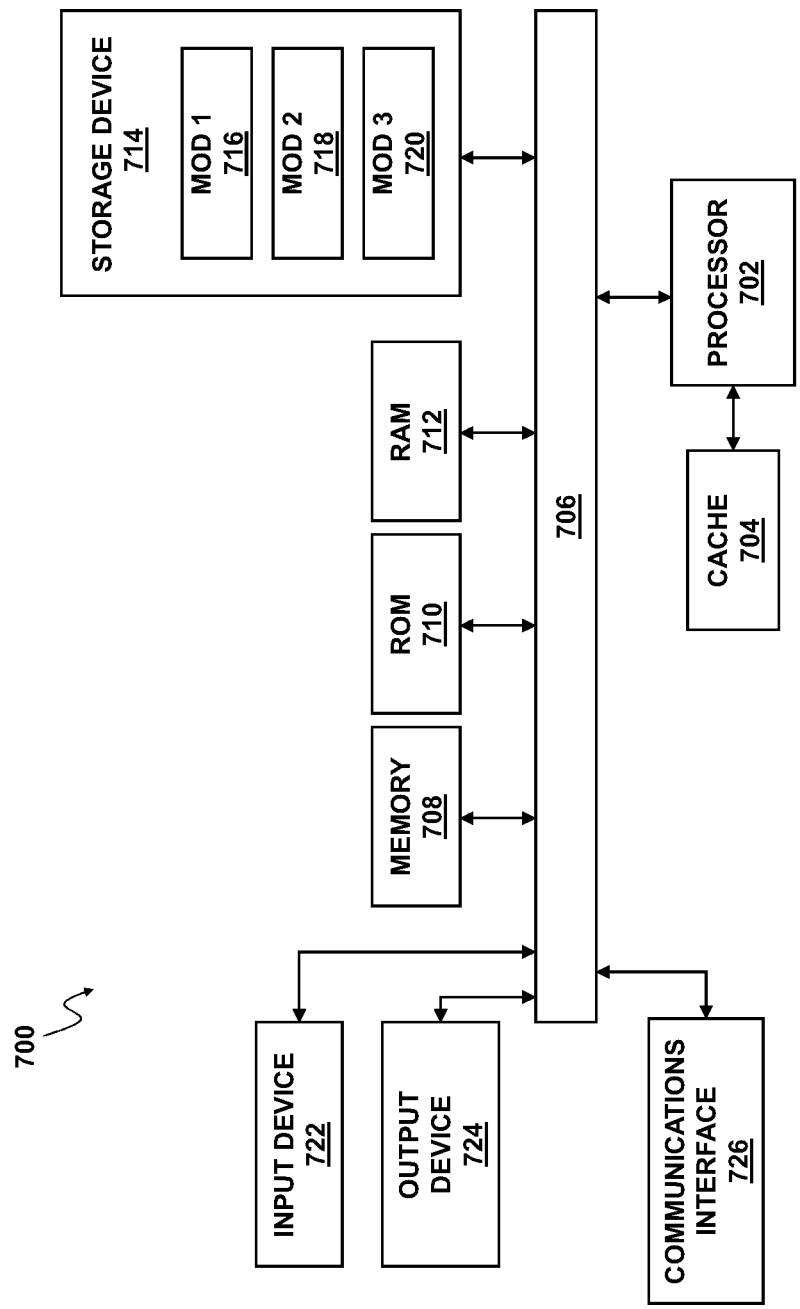
FIGS. 7 and 8 illustrate example systems suitable for implementing various embodiments of the present disclosure, according to some embodiments of the present disclosure.
Figure 8:
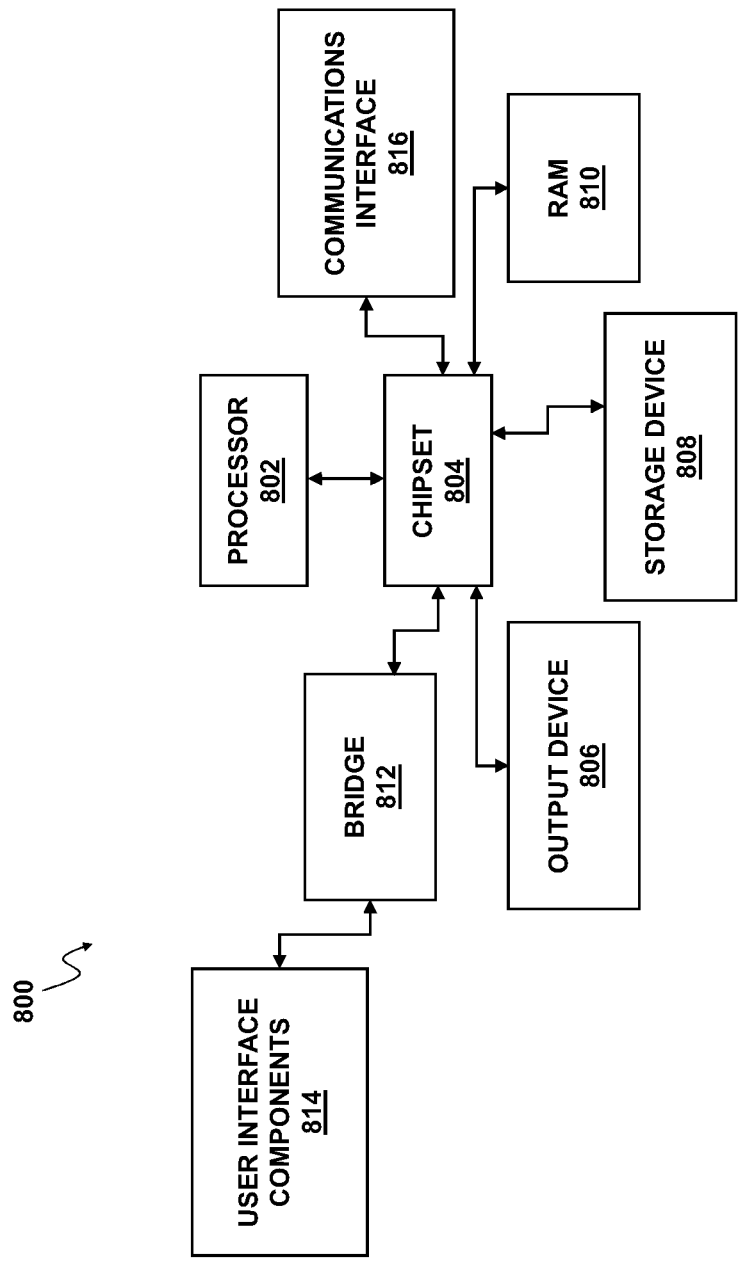

The functionality of leaf nodes and spine nodes in assisting data forwarding during convergence in EVPN multi-homed networks will now be described in greater detail with reference to FIGS. 2-5, respectively. Although descriptions of each of the FIGS. 2-5 may refer to elements shown in FIG. 1, any system, configured to perform the steps of the method 200, in any order, is within the scope of the present disclosure. FIGS. 6-8 illustrate some exemplary network devices/nodes and systems which could be used to implement various embodiments of the present disclosure, e.g. to implement any one of the leaf nodes, spine nodes, or any controllers used to control these network nodes to enable them to carry out their functionality in assisting data forwarding during convergence as described herein.

Figure 2:
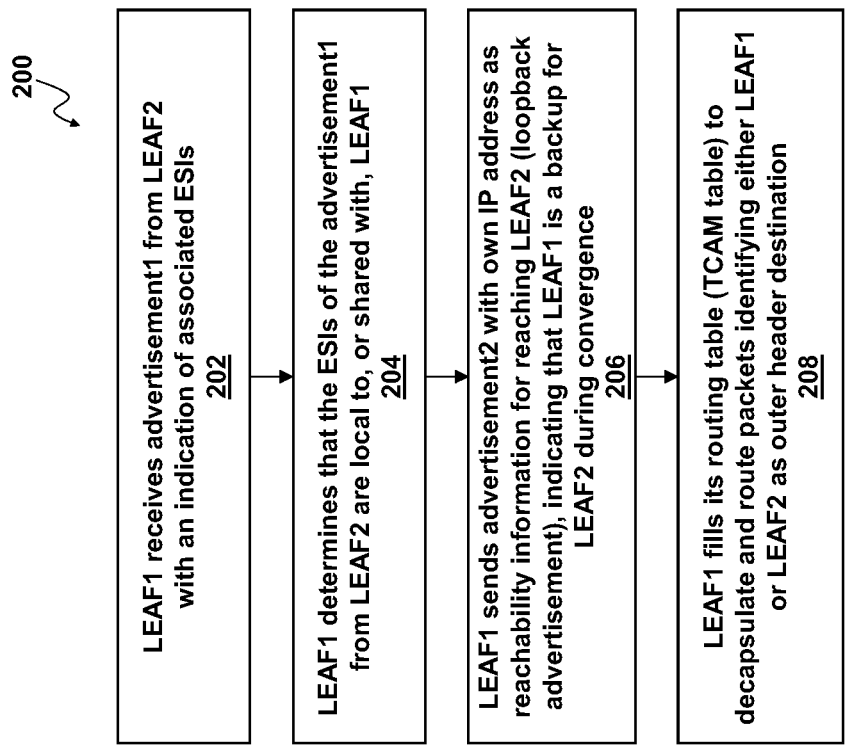
FIG. 2 is a flowchart of method steps illustrating a process of a leaf node assisting data forwarding during convergence, according to some embodiments of the present disclosure.

FIG. 2 is a flow diagram of a method 200 illustrating a process of a leaf node assisting data forwarding during convergence, according to some embodiments of the present disclosure. Since embodiments of the present disclosure are based on adjusting conventional functionality of leaf nodes which receive route advertisements from other nodes, FIG. 2 illustrates a method carried out by one of such leaf nodes. Therefore, continuing with the scenario described above, the method 200 is described from the perspective of the functionality of LEAF1. Of course, in general, any of the leaf nodes of a network environment such as e.g. the network environment 100 shown in FIG. 1 may be configured to carry out the method 200, and, preferably, each leaf node is indeed configured to perform the method 200 when triggered to do so. Furthermore, each leaf node is also further configured to carry out its conventional routing and forwarding functionality as known in the art, such as e.g. encapsulating data packets going upstream, decapsulating data packets going downstream, sending route advertisements to announce host prefixes reachable via the leaf node, etc.

Continuing with the scenario described above LEAF1 and LEAF2 will learn each other as ESI peers using EVPN type-1 and/or type-4 route advertisements, as described in RFC 7432, incorporated herein by reference in its entirety. To that end, the method 200 may begin with a step 202 where a leaf node in the network, e.g. LEAF1, receives these advertisements from LEAF2 (these one or more first route advertisements sent by LEAF2 are shown in FIG. 2 as "advertisement1"). Thus, LEAF1 receiving route advertisements from LEAF2 may be considered as a trigger for LEAF1 to carry out the method 200.

In various embodiments, LEAF2 may learn the routes to be advertised from the hosts H1-Hn, possibly via CE devices that the hosts may be connected to, and possibly via access networks present between the CE devices/hosts and LEAF2. LEAF2 then advertises the host prefixes that it learned to other leaf nodes in the network, where a routing reflector (RR) 150 shown in FIG. 1 may be used to ensure that the advertisements reach all of the leaf nodes in the network. In some embodiments, the one or more route advertisements sent by LEAF2 may be one or more EVPN route type-1 and/or route type-4 advertisements, indicating the one or more ESIs associated with the advertised prefixes. In other embodiments, any route advertisements sent by LEAF2, indicating the host IP prefixes being advertised and their associated ESIs are within the scope of the present disclosure.

Following receipt of the one or more route advertisements from LEAF2, LEAF1 proceeds, in step 204 of the method 200, with determining whether LEAF1 is an ESI peer to LEAF2, having Ethernet links with the ESIs identified in the advertisements by LEAF2 (i.e. whether the ESIs indicated in the advertisements of step 202 are local to LEAF1; in other words—whether LEAF1 has interfaces configured for the same ESIs or whether LEAF1 shares ESIs with LEAF2). LEAF1 receiving an EVPN type-1 and/or type-4 route advertisement from LEAF2 is sufficient to indicate to LEAF1 that LEAF2 is an ESI peer.

Therefore, from step 204 the method 200 proceeds to step 206, where LEAF1 advertises reachability information for LEAF2 by indicating the loopback IP address of LEAF2 in addition to its own IP address (shown in FIG. 2 as "advertisement2"), indicating to spine nodes that LEAF1 is a leaf node to be used as a backup leaf node for forwarding encapsulated packets destined to LEAF2 in case the primary node LEAF2 fails. In other embodiments, any route advertisements sent by LEAF1, indicating the IP prefix of LEAF1 as an IP prefix being advertised, and indicating that the advertised prefix is for another primary leaf node and that the leaf node sending the advertisements is a backup node are within the scope of the present disclosure. Because these advertisements of LEAF1 indicate own IP address of LEAF1 as the IP prefix for reaching LEAF2, these advertisements may be referred to as "loopback" or "tunnel destination loopback" advertisements.

In some embodiments, each of the backup nodes can provide an indication, in their loopback advertisements of step 206, about an order in which one of them is to be selected for forwarding packets to. For example, in some embodiments, LEAF1 can include a cost metric indicating to spine nodes that forwarding packets to LEAF1 which have outer destinations identifying LEAF2 has a higher cost than forwarding those packets to LEAF2 directly; in other embodiments, this cost difference with respect to the direct path can be assumed (i.e. the cost difference is not explicitly provided in the advertisements but spine nodes are configured to consider the direct path to a given leaf node to have the least cost compared to any other path to the leaf node). In this case, when a spine node has to determine to which leaf node to forward a downstream packet with a given outer destination, it will select a leaf node with the lowest cost which is available. Thus, if an outer destination identifies LEAF2 and LEAF2 is functioning, then a spine node will send the downstream packet to LEAF2, but LEAF2 has failed, then LEAF1 may be the next leaf node (i.e. backup VTEP for LEAF2) with the lowest cost to which the spine node can forward a packet having LEAF2 as the outer destination. In other embodiments, other criteria may be used. Since it could be that several leaf nodes will re-advertise the host prefixes of LEAF2 (e.g. LEAF1 and LEAF3 in the scenario being described), an order in which a backup node is selected by the spine node in case the primary VTEP fails may be established in the network. For example, each of the backup leaf nodes may be configured to advertise their loopback reachability information for LEAF2 with a different cost, where which cost parameter is used by which leaf node may be preconfigured or dynamically configured in the network. In some embodiments, leaf nodes may be configured to exchange control information with one another, indicating which cost (or other parameter(s) for establishing the hierarchy of backup nodes) each leaf node will include in advertising the loopback routes as is done in step 206.

In addition to advertising the loopback route in step 206, in response to the positive determination of step 204, LEAF1 also proceeds, in step 208 of the method 200 (which may be performed before, after, or at least partially simultaneously with the step 206), to prepare itself to serve as a backup node for LEAF2 in case LEAF2 fails and spine nodes begin to forward encapsulated packets having LEAF2 as an outer destination to LEAF1. To that end, LEAF1 may program/fill its routing table, e.g. a ternary content-addressable memory (TCAM) table of (or associated with) LEAF1, with information that will enable LEAF1 to decapsulate and route further downstream packets received from a spine node and having identifying LEAF2 as the outer destination.

Figure 3:
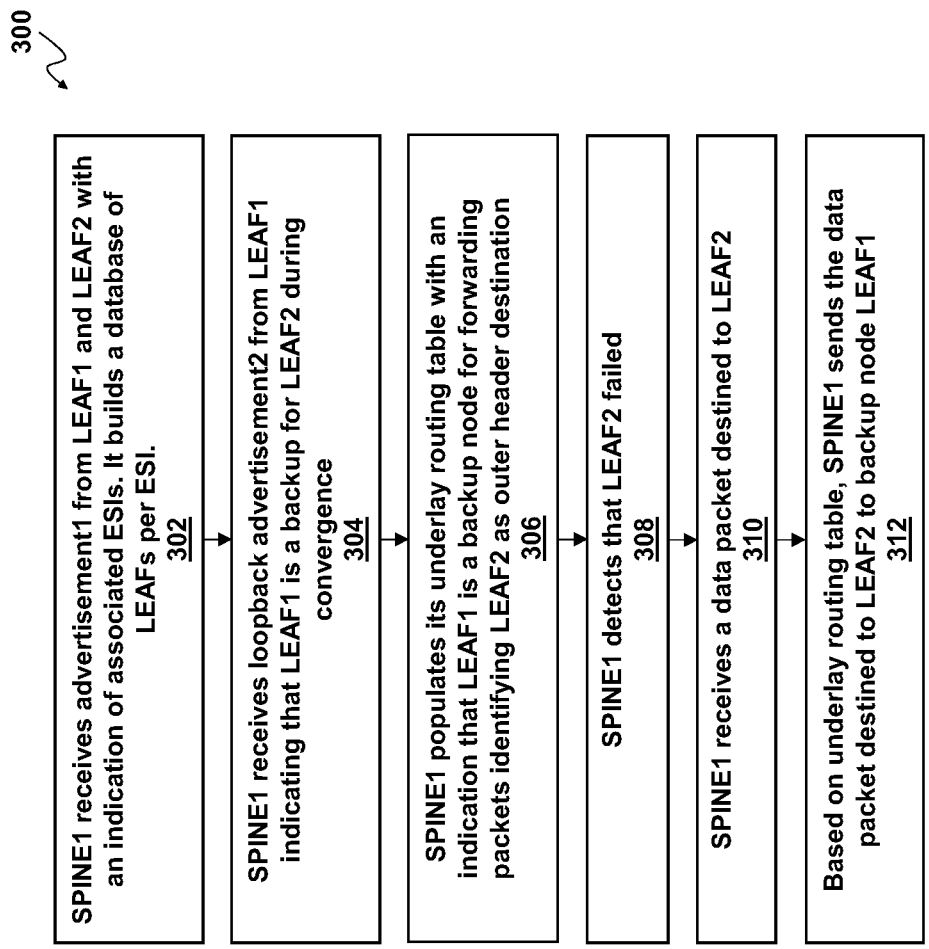
FIG. 3 is a flowchart of method steps illustrating a process of a spine node assisting data forwarding during convergence, according to some embodiments of the present disclosure.

FIG. 3 is a flowchart of a method 300 illustrating a process of a spine node assisting data forwarding during convergence, according to some embodiments of the present disclosure. Continuing with the scenario described above, the method 300 is described from the perspective of the functionality of SPINE1 shown in FIG. 1. Of course, in general, any of the spine nodes of a network environment such as e.g. the network environment 100 shown in FIG. 1 may be configured to carry out the method 300, and, preferably, each spine node is indeed configured to perform the method 300 when triggered to do so. Furthermore, each spine node is also further configured to carry out its conventional routing and forwarding functionality as known in the art, such as e.g. forwarding packets to IP addresses identified in the outer header destination fields.

The method 300 may begin with step 302 where a spine node, e.g. SPINE1 shown in FIG. 1, receives one or more first route advertisements (shown in FIG. 3 as "advertisement1") from LEAF2. These advertisements were described above with reference to step 202 of the method 200 and, therefore, in the interests of brevity, their descriptions are not repeated here.

In step 304, the spine node SPINE1 also receives one or more second route advertisements, loopback route advertisements (shown in FIG. 3 as "advertisement2") from LEAF1, indicating that LEAF1 is a backup node for forwarding packets destined to LEAF2. These loopback advertisements were described above with reference to step 206 of the method 200 and, therefore, in the interests of brevity, their description is also not repeated here.

In step 306, based on the route advertisements received in steps 302 and 304, SPINE1 updates its underlay route reachability information with an indication that the best path for forwarding packets, received at SPINE1, having an outer header identifying LEAF2 as the destination is to forward those packets directly to LEAF2, if LEAF2 is available, but if LEAF2 is unavailable (e.g. LEAF2 failed), then those packets can be forwarded to a backup node LEAF1 (i.e. that LEAF1 is a backup path for LEAF2 in case LEAF2 becomes unavailable/fails). While the method 300 illustrates SPINE1 populating its underlay route reachability table with information from the first and second advertisements in one step 306, in various embodiments, SPINE1 may also populate the underlay route reachability table with information as the advertisements come in, i.e. first add information that the best path for forwarding packets having an outer header identifying LEAF2 as the destination is to forward those packets to LEAF2 after the first advertisements are received in step 302, and then add information regarding LEAF1 being the backup path for packets destined to LEAF2 after the second route advertisement is received in step 304.

Once the routing table of SPINE1 is populated and no leaf nodes failed, SPINE1 operates in forwarding packets received from leaf nodes as known in the art, i.e. it forwards packets directly to VTEPs identified as destination in the outer headers of the packets.

At some point later, SPINE1 may detect that LEAF2 failed (e.g. SPINE1 may identify that a link to LEAF2 is down), shown with step 308 in FIG. 3. Since it takes some time until the network converges to reflect this failure, i.e. other leaf nodes don't know immediately that LEAF2 failed, other leaf nodes may still be sending data traffic to hosts H1-Hn identifying the IP and MAC addresses of LEAF2 as the outer header DIP and DMAC of the encapsulated packets. Thus, as shown with step 310 in FIG. 3, following the failure of LEAF2, SPINE1 may still receive encapsulated data packets destined to LEAF2 (i.e. it may still receive encapsulated packets having the outer DMAC encoding a MAC address of LEAF2 and having the outer DIP encoding an IP address of LEAF2). Since SPINE1 now includes backup path information for LEAF2 in its underlay routing table (step 306), SPINE1 will be able to look up a backup path for data traffic destined to LEAF2, in the scenario described herein—LEAF1, and will then forward the packet destined to LEAF2 to LEAF1 instead of the failed LEAF2, as shown with step 312 in FIG. 3.

In some embodiments, the packets sent by LEAF4 to the spine nodes and by the spine nodes to the downstream nodes may be Broadcast, Unicast, and Multicast (BUM) packets.

These packets can reach SPINE1 either encapsulated in outer unicast header if head-end replication procedures are used at LEAF4, or in outer multicast header if multicast replication procedures are used at LEAF4. In case of head-end replication, such packets at SPINE1 will be able to follow backup path advertised by LEAF1 on failure of LEAF2 and LEAF1 will forward packet to host as it will become the designated forwarder for a given Virtual Network Identifier (VNI). In case of multicast replication, as LEAF1 also joins the multicast tree, these packets at SPINE1 will reach LEAF1 on failure of LEAF2 and LEAF1 will forward packet to the desired host as it will become the designated forwarder for a given VNI.

Figure 4:
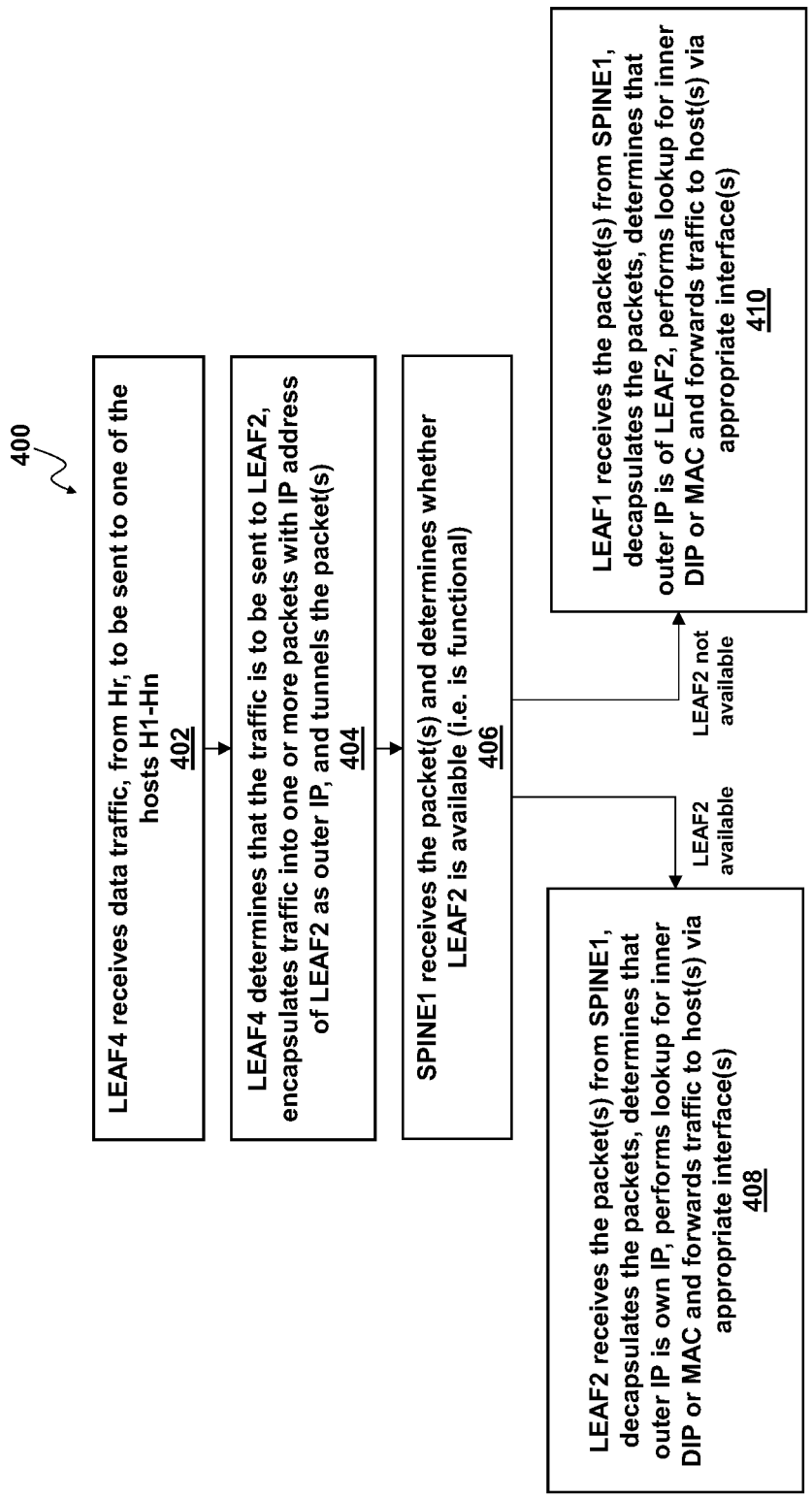
FIG. 4 is a flowchart of method steps illustrating a process of leaf and spine nodes cooperating in assisting data forwarding during convergence, according to some embodiments of the present disclosure.

FIG. 4 is a flow diagram of a method 400 illustrating a process of leaf and spine nodes cooperating in assisting data forwarding during convergence, according to some embodiments of the present disclosure. The method 400 continues with the scenario described above and summarizes the functionality described herein.

Continuing with the scenario described above, the method 400 may begin a step 402 where an ingress leaf node, in this scenario—LEAF4 shown in FIG. 1, receives, from the remote host Hr, data traffic that Hr wishes to send to one or more of the hosts H1-Hn multi-homed to LEAF1-LEAF3. Because LEAF4 previously received first route advertisements for host H1-Hn associated with ESIs1-n from LEAF2 (i.e. advertisement1 as shown in FIGS. 2 and 3 and described above), as well as route advertisements for the same set of ESIs from LEAF1 and LEAF3, LEAF4 knows that hosts H1-Hn are multi-homed to LEAF1-LEAF3. LEAF4 may then identify one of these leaf nodes as the leaf node to which it will send the traffic in order to reach hosts H1-Hn, e.g. based on hashing as known in the art. Consider that LEAF4 determines that the data traffic to reach the hosts H1-Hn is to be sent to LEAF2. In such an example, as shown with step 404 of FIG. 4, LEAF4 encapsulates the data traffic to be sent into one or more packets having a routing MAC (RMAC) of SPINE1 or SPINE2 being encoded as the outer DMAC of the packets and an IP of LEAF2 being encoded as the outer DIP of the packets and then tunnels the packet(s). The packet(s) tunneled in 404 reach one of the spine nodes, e.g. SPINE1, based on a two-way Equal-Cost Multi-Path routing (ECMP), as known in the art. Step 406 of FIG. 4 illustrates that SPINE1 receives the packet(s) from LEAF4 and determines whether the VTEP identified as the destination address in the outer header of the packet(s) (i.e., LEAF2) is available.

Upon positive determination in step 406 (i.e. LEAF2 is available), SPINE1 sends the packet(s) to LEAF2, and the method 400 proceeds with step 408. In step 408, LEAF2 receives the packet(s) and decapsulates the packet(s) as described above, identifies that the outer DIP of the packet(s) is its' own IP address, extracts from the decapsulated packet the original Ethernet frame that the remote host sent to its VTEP, performs lookup for the inner destination IP address or MAC address of the host (using the TCAM/routing table in LEAF2), and then forwards the data traffic to the appropriate host(s) via appropriate interfaces of LEAF2.

Upon negative determination in step 406 (i.e. LEAF2 is not available because e.g. LEAF2 failed or a link to LEAF2 failed), the method 400 proceeds with SPINE1 determining which backup node this traffic could be sent to instead of the leaf node LEAF2. As previously described herein, SPINE1 now has multiple paths for reaching LEAF2, e.g. the best path may be the path via LEAF2 (e.g. associated with a cost X), the next best path may be backup paths via LEAF1 and LEAF3 (e.g. associated with a cost X+Y), and the next best path after that may be a backup path via LEAF3 (e.g. associated with a cost X+Y+Z). Because the direct path to LEAF2 is no longer available since LEAF2 failed, SPINE1 will send the packet having LEAF2 as the outer header destination to the first backup path, e.g. to LEAF1, in the embodiments where lowest cost path is selected. In some embodiments, SPINE1 may be configured to determine the best path based on hashing between the remaining available leaf nodes, e.g. based on hashing between LEAF1 and LEAF3.

In general, as a part of performing step 406, SPINE1 may be considered to identify the best path that is available (i.e. not failed), based on any criteria specified. For example, since LEAF2 failed and the next best path that is available may be via LEAF1, SPINE1 will forward data traffic received from LEAF4 to LEAF1. In this case, as is shown with step 410, LEAF1 receives the packet(s), decapsulates the packet(s), and identifies that the outer IP of the packet(s) is an IP address of LEAF2. LEAF1 will also extract from the decapsulated packet the inner DMAC or IP address of the host from the original Ethernet frame that the remote host sent to its VTEP. Because LEAF1 now has IP of LEAF2 programmed into its' routing table (per step 208) to decapsulate packet, LEAF1 can perform a lookup, in the TCAM/ routing table in LEAF1, of the IP address or MAC address of the host extracted from the packet received at 410, and can then forward the data traffic to the appropriate host(s) via appropriate interfaces of LEAF1.

Encapsulated traffic from Hr to one or more hosts H1-Hn will continue being forwarded as described above, i.e. using backup path(s), until EVPN convergence happens. At that point, i.e. when convergence is complete, LEAF4 will only have a two-way ECMP for reaching hosts H1-Hn, i.e. with LEAF1 and LEAF3 (since LEAF2 failed) as possible tunnel endpoints.

For traffic travelling in the opposite direction, i.e. from one or more of the hosts H1-Hn to the remote host Hr, data forwarding is performed in a conventional manner since hosts H1-Hn will be sending data traffic to one of LEAF1 and LEAF3 (since LEAF2 failed), e.g. using hashing.

In some implementations, once LEAF2 fails and until the BGP convergence is finished, LEAF1 may be receiving two BUM packets from a spine node for each data packet sent by the remote leaf node LEAF4, a situation which may be particularly relevant if head-end replication is used at LEAF4. In order to avoid situations that LEAF1 would send duplicate data packets to the host(s) (one packet per each BUM packet received), in some embodiments, e.g. as a part of the step 208, LEAF1 may be configured with drop access control lists identifying BUM packet meant to be sent to LEAF2.

Figure 5:
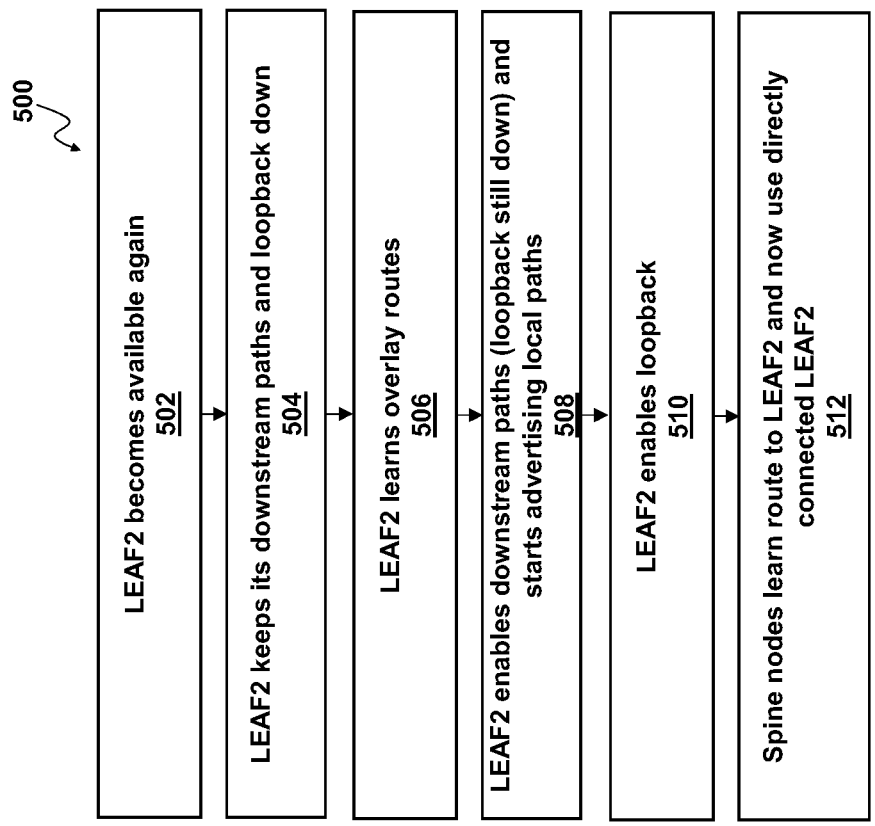
FIG. 5 is a flowchart of method steps illustrating a process following a failed leaf node becoming available again, according to some embodiments of the present disclosure.

FIG. 5 is a flow diagram of a method 500 illustrating a process following a failed leaf node becoming available again, according to some embodiments of the present disclosure. The method 500 continues with the scenario described above where LEAF2 was the failed node.

Continuing with this scenario described above, the method 500 may begin with step 502 where LEAF2 becomes available again.

Immediately after becoming available, LEAF2 may still keep its downstream paths and loopback disabled/down, as shown with a step 504 of FIG. 5. In other words, LEAF2 does not yet enable its downstream interfaces to hosts H1-Hn and does not yet advertise its own loopback IP. Also LEAF2 may start a downstream-path-bringup-delay timer to open up downstream interfaces to hosts H1-Hn and a higher overlay-route-learning-delay-timer to learn all overlay routes.

Gradually, LEAF2 starts learning overlay routes, in step 506 of the method 500, by receiving route advertisements sent by other leaf nodes (possibly via the RR 150).

LEAF2 may enable downstream paths once the downstream-path-bringup-delay of LEAF2 expires, and start advertising local paths, as shown with step 508 in FIG. 5. At that time, LEAF2 still keeps its loopback advertisement down.

After LEAF2 enabled all of the downstream paths and its overlay-route-learning-delay-timer expires, it enables its loopback advertisements (i.e., LEAF2 starts sending loopback advertisements identifying itself as a backup path to reach other leaf nodes as e.g. was done in step 206, described above) and starts advertising routes to hosts connected to it, in step 510 shown in FIG. 5. From these advertisements, spine nodes learn a better route to LEAF2, via the direct connection to LEAF2, and now use this direct connection to LEAF2 to forward data packets having LEAF2 as the outer header destination, instead of the backup paths, as shown with step 512 of FIG. 5.

Exemplary Devices

FIG. 6 illustrates an example network device 600 suitable for implementing various embodiments of the present disclosure, e.g. embodiments related to assisting data forwarding during convergence. In various embodiments, the network device 600 could be any one of network nodes described herein, e.g. the network device 600 may be used to implement the functionality of any one of the nodes within the network environment 100, such as e.g. any one of the leaf nodes or/and any one of the spine nodes shown in FIG. 1. In some embodiments, the network device 600 could be communicatively connected to any one of network elements described herein in order to configure any one of these elements to carry out their functionality in distributing network path information as described herein.

As shown in FIG. 6, the network device 600 includes a master central processing unit (CPU) 610, interfaces 620, and a bus 630 (e.g., a PCI bus). When acting under the control of appropriate software or firmware, the CPU 610 may be responsible for executing processing of route advertisement messages, packet management, error detection, and/or routing or forwarding functions. The CPU 610 can accomplish all these functions under the control of software including an operating system and any appropriate applications software. CPU 610 may include one or more processors 614 such as e.g. a processor from the Motorola family of microprocessors or the MIPS family of microprocessors. In an alternative embodiment, processor 614 is specially designed hardware for controlling the operations of network device 600 in accordance with embodiments described herein. In a specific embodiment, a memory 612 (such as non-volatile RAM and/or ROM) also forms part of CPU 610. However, there are many different ways in which memory could be coupled to the system.

The interfaces 620 are typically provided as interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 610 to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 612) configured to store program instructions for the general-purpose network operations and mechanisms for route advertisement, route optimization and routing functions described herein. The program instructions may control the operation of an operating system and/or one or more applications, for example. The memory or memories may also be configured to store tables such as TCAM table(s), mobility binding, registration, and association tables, etc.

FIGS. 7 and 8 illustrate example systems, according to some embodiments of the present disclosure. The more appropriate embodiment will be apparent to those of ordinary skill in the art when practicing the present technology. Persons of ordinary skill in the art will also readily appreciate that other system embodiments are possible.

Systems such as the ones shown in FIGS. 7 and 8 are also suitable for implementing various embodiments of the present disclosure, e.g. embodiments related to assisting data forwarding during convergence described herein. In various embodiments, such systems could be any one of or could be communicatively connected to in order to configure any one of the network nodes described herein to enable functionality of these nodes as described above, e.g. any of the leaf nodes and/or any of the spine nodes of the network environment 100 shown in FIG. 1.

FIG. 7 illustrates a conventional system bus computing system architecture 700 wherein the components of the system are in electrical communication with each other. Exemplary system 700 includes a processing unit (CPU or processor) 702, communicatively connected to a system bus 706. The system bus 706 couples various system components to the processor 702, the system components including e.g. a system memory 708, a read only memory (ROM) 710, and a random access memory (RAM) 712. The system 700 can include a cache 704 of high-speed memory connected directly with, in close proximity to, or integrated as part of the processor 702. The system 700 can copy data from the memory 708 and/or the storage device 714 to the cache 704 for quick access by the processor 702. In this way, the cache 704 can provide a performance boost that avoids processor 702 delays while waiting for data. These and other modules can control or be configured to control the processor 702 to perform various actions. Other system memory 708 may be available for use as well. The memory 708 can include multiple different types of memory with different performance characteristics. The processor 702 can include any general purpose processor and a hardware module or software module, such as module 1 716, module 2 718, and module 3 720 stored in the storage device 714, configured to control the processor 702 as well as a special-purpose processor where software instructions are incorporated into the actual processor design. The processor 702 may essentially be a completely self-contained computing system, containing multiple cores or processors, a bus, memory controller, cache, etc. A multi-core processor may be symmetric or asymmetric.

To enable user interaction with the computing device 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing device 700. The communications interface 726 can generally govern and manage the user input and system output. There is no restriction on operating on any particular hardware arrangement and therefore the basic features here may easily be substituted for improved hardware or firmware arrangements as they are developed.

Storage device 714 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 712, read only memory (ROM) 710, and hybrids thereof.

The storage device 714 can include software modules 716, 718, 720 for controlling the processor 702. Other hardware or software modules are contemplated. The storage device 714 can be connected to the system bus 706. In one aspect, a hardware module that performs a particular function can include the software component stored in a non-transitory computer-readable medium in connection with the necessary hardware components, such as the processor 702, bus 706, display 724, and so forth, to carry out the function.

FIG. 8 illustrates an example computer system 800 having a chipset architecture that can be used in executing the described method and generating and displaying a graphical user interface (GUI). Computer system 800 is an example of computer hardware, software, and firmware that can be used to implement the disclosed technology. System 800 can include a processor 802, representative of any number of physically and/or logically distinct resources capable of executing software, firmware, and hardware configured to perform identified computations. Processor 802 can communicate with a chipset 804 that can control input to and output from processor 802. In this example, chipset 804 outputs information to output 806, such as a display, and can read and write information to storage device 808, which can include magnetic media, and solid state media, for example. Chipset 804 can also read data from and write data to RAM 810. A bridge 812 for interfacing with a variety of user interface components 814 can be provided for interfacing with chipset 804. Such user interface components 814 can include a keyboard, a microphone, touch detection and processing circuitry, a pointing device, such as a mouse, and so on. In general, inputs to system 800 can come from any of a variety of sources, machine generated and/or human generated.

Chipset 804 can also interface with one or more communication interfaces 816 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 802 analyzing data stored in storage 808 or 810. Further, the machine can receive inputs from a user via user interface components 814 and execute appropriate functions, such as browsing functions by interpreting these inputs using processor 802.

It can be appreciated that example systems 700 and 800 can have more than one processor 702, 802, or be part of a group or cluster of computing devices networked together to provide greater processing capability.

Variations and Implementations

While embodiments of the present disclosure are described with reference to the leaf-spine architecture as illustrated with the IP fabric shown in FIG. 1, these embodiments are applicable to a broader scope of any VXLAN-based IP fabric, beyond what is shown in FIG. 1. In particular, functionality of the leaf nodes and the spine nodes related to assisting data forwarding during convergence, described herein, is applicable to any IP traffic comprising a plurality of leaf and spine nodes, connected in any network topology. Furthermore, embodiments of the present disclosure are applicable to any type of encapsulation used in the overlay networks, and to any multi-homing configuration and mode of operation of the hosts.

As used herein, the term "leaf node" refers to any network element/node configured with the functionality of a leaf node as described herein. As used herein, the term "spine node" refers to any network element/node configured with the functionality of a spine node as described herein.

The route advertisement messages described herein may be a MAC/IP Advertisement Route of EVPN BGP. Each of these route advertisement messages may be an EVPN BGP update message comprising Network Layer Reachability Information ("NLRI") for the hosts/leaf nodes being advertised.

It should be noted that much of the infrastructure discussed herein can be provisioned as a part of any type of a network node.

In one implementation, network nodes described herein can include software to achieve (or to foster) the network path distribution activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, operations related to assisting data forwarding during convergence may be executed externally to these devices, or included in some other network element to achieve the intended functionality. Alternatively, these network devices may include software (or reciprocating software) that can coordinate with other network elements in order to achieve activities related to assisting data forwarding during convergence, described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible scenarios and patterns that may be executed by, or within, communication systems/network nodes shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method for a first Virtual Tunnel End Point ("VTEP") node, in a network comprising a plurality of VTEP nodes, to assist data forwarding during convergence, the method comprising:

the first VTEP node receiving one or more first route advertisement messages from a second VTEP node, the one or more first route advertisement messages comprising reachability information for a plurality of hosts associated with one or more Ethernet Segment Identifiers (ESIs);

the first VTEP node determining that the one or more ESIs of the one or more first route advertisement messages are local to the first VTEP node;

the first VTEP node sending one or more second route advertisement messages comprising reachability information for the second VTEP node indicating that the first VTEP node is a backup node for the second VTEP node during convergence; and the first VTEP node receiving an encapsulated packet having an outer header that identifies the second VTEP node as a destination of the packet.

2. The method according to claim 1, wherein the one or more first route advertisement messages are Ethernet Virtual Private Network ("EVPN") Border Gateway Protocol ("BGP") messages.

3. The method according to claim 1, further comprising the first VTEP node storing, in a routing table of the first VTEP node, entries associated with the second VTEP node and comprising reachability information for the plurality of hosts advertised by the second VTEP node.

4. The method according to claim 3, further comprising:
the first VTEP node decapsulating the packet;
the first VTEP node extracting an inner destination Internet Protocol (IP) or Media Access Control (MAC) address of a host from the decapsulated packet; and
the first VTEP node forwarding data from the decapsulated packet to the host using the extracted IP address or MAC address of the host.

5. The method according to claim 4, wherein the outer header of the packet comprises an IP address of the second VTEP node as a destination IP address (DIP) of the packet and a MAC address of one of one or more spine nodes as a destination MAC address (DMAC) of the packet.

6. The method according to claim 1, wherein the first VTEP node sending the one or more second route advertisement messages comprising reachability information for the second VTEP node indicating that the first VTEP node is the backup node for the second VTEP node during convergence comprises the first VTEP node sending the one or more second route advertisement messages comprising an IP address of the first VTEP node and an IP address of the second VTEP node.

7. The method according to claim 1, wherein the network is a Virtual extensible Local Area Network ("VXLAN").

8. A method for a spine node, in a network comprising a plurality of Virtual Tunnel End Point ("VTEP") nodes, to assist data forwarding during convergence, the method comprising:

the spine node receiving one or more first route advertisement messages from a second VTEP node, the one or more first route advertisement messages including reachability information for a plurality of hosts associated with one or more Ethernet Segment Identifiers (ESIs);

the spine node receiving one or more second route advertisement messages from a first VTEP node, the one or more second route advertisement messages including reachability information for the second VTEP node indicating that the first VTEP node is a backup node for the second VTEP node during convergence;

the spine node indicating in an underlay routing table of the spine node that the first VTEP node is the backup node in case the second VTEP node fails;

the spine node forwarding received encapsulated packets to one of the plurality of VTEP nodes based on the underlay routing table; and the spine node forwarding, to the first VTEP node, an encapsulated packet comprising an Internet Protocol (IP) address of the second VTEP node as a destination IP address (DIP) of the encapsulated packet.

9. The method according to claim 8, further comprising:
the spine node detecting that the second VTEP node failed;
the spine node receiving the encapsulated packet; and
the spine node determining from the underlay routing table that the first VTEP node is the backup node for the second VTEP node.

10. The method according to claim 9, wherein the encapsulated packet comprises a Media Access Control (MAC) address of the spine node as a destination MAC address (DMAC) of the encapsulated packet.

11. The method according to claim 8, wherein the one or more second route advertisement messages including reachability information for the second VTEP node indicating that the first VTEP node is the backup node for the second VTEP node during convergence comprises the one or more second route advertisement messages comprising an IP address of the first VTEP node and the IP address of the second VTEP node.

12. The method according to claim 8, wherein the backup node is a first backup node, the method further comprising:
the spine node receiving one or more third route advertisement messages from a third VTEP node, the one or more third route advertisement messages including reachability information for the second VTEP node indicating that the third VTEP node is a second backup node for the second VTEP node during convergence; and the spine node indicating in the underlay routing table that the third VTEP node is the second backup node in case the second VTEP node fails.

13. The method according to claim 12, further comprising:
the spine node detecting that the second VTEP node failed;
the spine node receiving the encapsulated packet; and
the spine node determining from the underlay routing table that the first VTEP node is the first backup node and that the third VTEP node is the second backup node for the second VTEP node.

14. The method according to claim 13, further comprising: the spine node determining whether to forward the encapsulated packet to the first VTEP node or the third VTEP node based on one or more cost metrics associated with the first VTEP node and the third VTEP node.

15. A first Virtual Tunnel End Point ("VTEP") node, in a network comprising a plurality of VTEP nodes, to assist data forwarding during convergence, the first VTEP node comprising:
at least one memory element configured to store computer executable instructions, and at least one processor coupled to the at least one memory element and configured, when executing the instructions, to:

receive one or more first route advertisement messages from a second VTEP node, the one or more first route advertisement messages comprising reachability information for a plurality of hosts associated with one or more Ethernet Segment Identifiers (ESIs);

determine that the one or more ESIs of the one or more first route advertisement messages are local to the first VTEP node;

send one or more second route advertisement messages comprising reachability information for the second VTEP node indicating that the first VTEP node is a backup node for the second VTEP node during convergence; and receive an encapsulated packet having an outer header that identifies the second VTEP node as a destination of the packet.

16. The first VTEP node according to claim 15, wherein the at least one processor is further configured to:

store, in a routing table of the first VTEP node, entries associated with the second VTEP node and comprising reachability information for the plurality of hosts advertised by the second VTEP node.

17. The first VTEP node according to claim 16, wherein the at least one processor is further configured to:

decapsulate the packet;

extract an inner destination Internet Protocol (IP) or Media Access Control (MAC) address of a host from the decapsulated packet; and forward data from the decapsulated packet to the host using the extracted IP address or MAC address of the host.

18. The first VTEP node according to claim 17, wherein the outer header of the packet comprises an IP address of the second VTEP node as a destination IP address (DIP) of the packet and a MAC address of one of one or more spine nodes as a destination MAC address (DMAC) of the packet.

19. The first VTEP node according to claim 15, wherein the one or more second route advertisement messages include an IP address of the first VTEP node and an IP address of the second VTEP node.

20. The first VTEP node according to claim 15, wherein the first VTEP node is a leaf node of the network.

* * * * *